US010271537B2

(12) United States Patent
Papke

(10) Patent No.: US 10,271,537 B2
(45) Date of Patent: Apr. 30, 2019

(54) MOTORIZED MATERIAL BROADCAST SPREADER APPARATUS

(71) Applicant: Exmark Manufacturing Company, Incorporated, Beatrice, NE (US)

(72) Inventor: Clark S. Papke, Cortland, NE (US)

(73) Assignee: EXMARK MANUFACTURING COMPANY, INCORPORATED, Beatrice, NE (US)

(*) Notice: Subject to any disclaimer, the term of this patent is extended or adjusted under 35 U.S.C. 154(b) by 546 days.

(21) Appl. No.: 14/698,061

(22) Filed: Apr. 28, 2015

(65) Prior Publication Data

US 2016/0316615 A1 Nov. 3, 2016

(51) Int. Cl.
| *A01M 9/00* | (2006.01) |
| *A01C 15/00* | (2006.01) |
| *A01C 17/00* | (2006.01) |
| *E01H 10/00* | (2006.01) |

(52) U.S. Cl.
CPC ......... *A01M 9/0076* (2013.01); *A01C 15/006* (2013.01); *A01C 17/005* (2013.01); *E01H 10/007* (2013.01)

(58) Field of Classification Search
CPC ... A01C 17/003; A01C 15/006; A01C 17/005; A01C 15/003; A01C 17/001; A01C 17/006; A01C 7/102; A01C 19/02; A01C 7/201; A01C 15/007; A01M 9/0076; E01H 10/007; B65G 23/22
USPC ........................................ 239/684, 681, 682
See application file for complete search history.

(56) References Cited

U.S. PATENT DOCUMENTS

| 3,819,120 | A | | 6/1974 | Walker |
| 4,106,703 | A | * | 8/1978 | Magda .................. A01C 17/00 239/656 |
| 4,487,370 | A | | 12/1984 | Speicher |
| 4,548,362 | A | | 10/1985 | Doering |
| D282,931 | S | | 3/1986 | Doering et al. |
| 4,624,195 | A | | 11/1986 | Doering |
| 4,867,381 | A | | 9/1989 | Speicher |
| 5,333,795 | A | | 8/1994 | Jessen |
| 5,361,988 | A | | 11/1994 | Nelson |
| 5,385,306 | A | * | 1/1995 | Cervenka ............... A01D 43/14 239/289 |

(Continued)

OTHER PUBLICATIONS

U.S. Appl. No. 14/875,861, filed Oct. 6, 2015, Papke et al.

(Continued)

*Primary Examiner* — Darren W Gorman
(74) *Attorney, Agent, or Firm* — Mueting, Raasch & Gebhardt, P.A.

(57) ABSTRACT

A powered material broadcast spreader apparatus. The apparatus may include a granular material hopper having one or more upwardly extending walls that partially enclose an interior volume of the hopper. A first wall may define an opening passing outwardly from the interior volume. The apparatus may also include a motor surrounded by the one or more walls, and a motor cover having a contact surface congruent with a mating inner surface of the first wall. The motor cover is configured to form a motor compartment adapted to effectively isolate the motor from the interior volume, while permitting access to the motor from outside the hopper via the opening in the first wall.

20 Claims, 6 Drawing Sheets

(56) References Cited

U.S. PATENT DOCUMENTS

| | | | | |
|---|---|---|---|---|
| 5,860,604 | A * | 1/1999 | Kooiker | E01C 19/203 239/670 |
| 6,135,036 | A | 10/2000 | Speicher, III et al. | |
| 6,336,600 | B1 | 1/2002 | Jessen | |
| 6,502,771 | B1 * | 1/2003 | Wyne | A01C 17/001 224/514 |
| 6,932,287 | B2 | 8/2005 | Kost et al. | |
| 7,063,280 | B1 | 6/2006 | Bogart et al. | |
| 7,954,573 | B2 | 6/2011 | Jessen | |
| 8,056,828 | B1 | 11/2011 | Kline et al. | |
| 8,074,904 | B1 | 12/2011 | Hobbs | |
| D662,522 | S | 6/2012 | Simpson | |
| 8,262,004 | B2 * | 9/2012 | Gamble, II | A01C 15/006 239/172 |
| 8,382,014 | B2 * | 2/2013 | Cichy | A01C 17/001 239/676 |
| 8,474,735 | B2 | 7/2013 | Hobbs, Jr. et al. | |
| 8,632,018 | B2 | 1/2014 | Kline et al. | |
| 2010/0200680 | A1 | 8/2010 | Hobbs, Jr. et al. | |
| 2012/0090287 | A1 * | 4/2012 | O'Daniel | A01C 15/06 56/16.8 |
| 2013/0233938 | A1 * | 9/2013 | Norkus | E01C 19/203 239/7 |
| 2014/0131465 | A1 | 5/2014 | Kline et al. | |

OTHER PUBLICATIONS

U.S. Appl. No. 29/525,222, filed Apr. 28, 2015, Nicholson et al.
U.S. Appl. No. 14/697,909, filed Apr. 28, 2015, Cook et al.
"100 lb ATV Spreader" Info Sheet [online]. Buyers Products Co. Archive dated Mar. 12, 2014 [retrieved Sep. 8, 2015]. Retrieved from the Internet: <URL: https://web.archive.org/20140312225058/http://www.buyersproducts.com/Spreaders/ATV-Spreaders/100-lb-ATV-Spreader/14>; 1 page.
"Installation Instructions: ATVS100 ATV Spreader" [online]. Buyers Products Co., Date Unknown [retrieved on Sep. 8, 2015]. Retrieved from the Internet: <URL: http://www.buyersproducts.com/Common/Documents/3011654_C.pdf>; 4 pages.
"Cub Cadet Commercial Offers 3-in-1 Stand-on Spreader/Sprayer: Application Landscapers Get Productivity Boost with Granular, Liquid, and Spot-Spray Capability in One Machine" [online]. Oct. 23, 2008 [retrieved on Jun. 23, 2015]. Retrieved from the Internet: <URL: http://newsroom.cubcadet.com/newsroom/article/new-articlepage-17#images>; 2 pages.
"Cub Cadet Commercial, Hydrostatic Stand-On Self-Propelled Spreader-Sprayer: Operator's Manual;" Form #769-04150 Rev. 09-0, Cub Cadet LLC, Cleveland, Ohio, Nov. 12, 2008; 20 pages.
"EarthWay EV-N-SPRED, Operation and Assembly Manual for the M30 12-volt ATV Broadcast Spreader." Form 09-2014 Part #52195. EarthWay Products, Inc., Bristol, Indiana. Sep. 2014, 6 pages.
"Ground Logic—Go for a Joyride," web page [online]. Ground Logic, Inc. Archive dated May 17, 2014, copyright 2011 [retrieved on Jun. 23, 2015]. Retrieved from the Internet: <URL: https://web.archive.org/web/20140517085448/http://groundlogicinc.com/>; 1 page.
"2015 Ground Logic—Premium Commercial Spreading & Spraying Equipment," Sales Brochure. Ground Logic Inc., Lincoln, Nebraska, 4 pages.
"L.T. Rich Products, Inc.—Owners Manual—JR36R / ZS-3620R Z-Spray," Owners Manual. Available at least as early as Jul. 1, 2015. L.T. Rich Products, Inc., Lebanon, Indiana, 27 pages.
"Commercial Sprayers, Seeders, & Aerators-Indiana-Z-Spray," web page [online]. L.T. Rich Products, Inc. Copyright 2015 [retrieved on Jun. 23, 2015]. Retrieved from the Internet: <URL: www.z-spray.com/z-spray-sprayers/>; 3 pages.
"L.T. Rich Products: JR-36R," web page [online]. Jan. 15, 2013 [retrieved on Jun. 23, 2015]. Retrieved from the Internet: <URL: http://landscapemanagement.net/l-t-rich-products-jr-36r>, 2 pages.
"PermaGreen Triumph Spreader Sprayer Operator's Manual." Operator's Manual, North American Version (v12). Perma-Green Supreme, Inc. Feb. 9, 2010; 45 pages.
"PermaGreen Triumph Spreader Sprayer Operator's Manual: Model C1C with Serial No. 14151 and above." Operator's Manual, North American Version (v15). Perma-Green Supreme, Inc. Nov. 9, 2014; 44 pages.
"PermaGreen: It's Your Future," Sales Brochure. Perma-Green Supreme, Inc. Copyright 2014; 12 pages.
"R57200 Spread-N-Spray: TurfEx's RS7200 Spread-N-Spray isn't just a spreader/sprayer combination . . . It's the most efficient way to care for turf," Brochure. Trynex International. Copyright 2012; 2 pages.
"RS7200E Spread-N-Spray: The NEW RS7200E Spread-N-Spray," Brochure. Trynex International. Copyright 2013; 2 pages.

\* cited by examiner

US 10,271,537 B2

MOTORIZED MATERIAL BROADCAST SPREADER APPARATUS

Embodiments described herein include motorized granular material broadcast spreaders operable to distribute granular material over a ground surface.

BACKGROUND

Material broadcast spreaders are used to distribute granular materials such as fertilizer, seed, and ice melting compounds to a ground surface. Generally speaking, the spreader may include a hopper that delivers the granular material to a rotating spinner, the latter which then broadcasts or "slings" the material outwardly where it ultimately settles upon the ground surface.

Manual broadcast spreaders are pushed or pulled over the ground surface by a walk-behind operator, or by a tow vehicle. Typically, these spreaders include ground-engaging support wheels that are operatively connected to the spinner such that rotation of the support wheels results in corresponding rotation of the spinner.

However, other broadcast spreaders (e.g., vehicle mounted spreaders) may be powered, e.g., include a motor that rotates the spinner during spreader operation. Such powered spreaders are popular among landscape contractors and other turf professionals as they are well-suited to all-day usage, and may further offer improved control over material distribution (as compared to manual spreaders).

Some powered spreaders position the motor outside the hopper (e.g., below the spinner). However, such a configuration requires a spreader design that provides sufficient space to accommodate the motor. To minimize this space requirement, other spreaders may locate the motor within the hopper itself. However, hopper-contained motors may present other drawbacks including, for example: excessive exposure of the motor to the potentially corrosive material contained within the hopper; and limited availability of cooling air flow.

SUMMARY

Embodiments described herein may provide a powered, material broadcast spreader apparatus that includes a granular material hopper having one or more upwardly extending walls that together partially enclose an interior volume of the hopper, wherein a first wall of the one or more walls defines an opening passing outwardly from the interior volume through the first wall. A motor is provided and surrounded by the one or more walls, wherein the motor includes a motor housing and an output shaft extending downwardly from the motor housing through an aperture formed in the hopper. The apparatus further includes a motor cover having a contact surface congruent with a mating inner surface of the first wall. The motor cover is positioned within the interior volume of the hopper such that the contact surface adjoins the mating inner surface of the first wall to effectively seal the opening. The motor cover is further configured to form a motor compartment adapted to effectively isolate the motor from the interior volume, wherein the motor compartment is accessible from outside the hopper via the opening in the first wall.

In yet another embodiment, a powered, material broadcast spreader apparatus is provided that includes a granular material hopper having a floor, upwardly extending front and rear walls, and upwardly extending left and right walls, wherein the floor and the walls together define an interior volume of the hopper. A first wall of the front and rear and left and right walls defines an opening passing outwardly from the interior volume through the first wall. The apparatus also includes a motor positioned between: the front and rear walls; and the left and right walls, the motor including a motor housing and an output shaft extending downwardly from the motor housing through an aperture formed in the floor. A motor cover is also provided and includes a contact surface congruent with a mating inner surface of the first wall. The motor cover is positioned between the front and rear walls and between the left and right walls such that the motor cover surrounds the motor and the contact surface adjoins the mating inner surface to effectively seal the opening. The motor cover is further configured to form a motor compartment adapted to separate the motor from granular material contained within the interior volume, wherein the motor compartment is accessible, via the opening in the first wall, from outside the hopper.

In still another embodiment, a powered vehicle is provided that includes: a chassis; ground engaging members adapted to support the chassis relative to a ground surface; a prime mover attached to the chassis and adapted to provide power to one or more of the ground engaging members; and a material broadcast spreader apparatus attached to the chassis at or near a front end of the chassis. The apparatus includes a granular material hopper comprising a floor, upwardly extending front and rear walls, and upwardly extending left and right walls, wherein the floor and the walls together define an interior volume of the hopper, and wherein the rear wall defines an opening passing outwardly from the interior volume through the rear wall. The apparatus further includes a motor positioned between: the front and rear walls; and the left and right walls, the motor including a motor housing and an output shaft extending downwardly from the motor housing through an aperture formed in the floor. A motor cover is also included and has a contact surface congruent with a mating inner surface of the rear wall. The motor cover is positioned between the front and rear walls and between the left and right walls such that the motor cover at least partially surrounds the motor and the contact surface adjoins the mating inner surface to effectively seal the opening. The motor cover is further configured to form a motor compartment adapted to separate the motor from granular material contained within the interior volume, wherein the motor compartment is accessible, via the opening in the rear wall, from outside the hopper.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
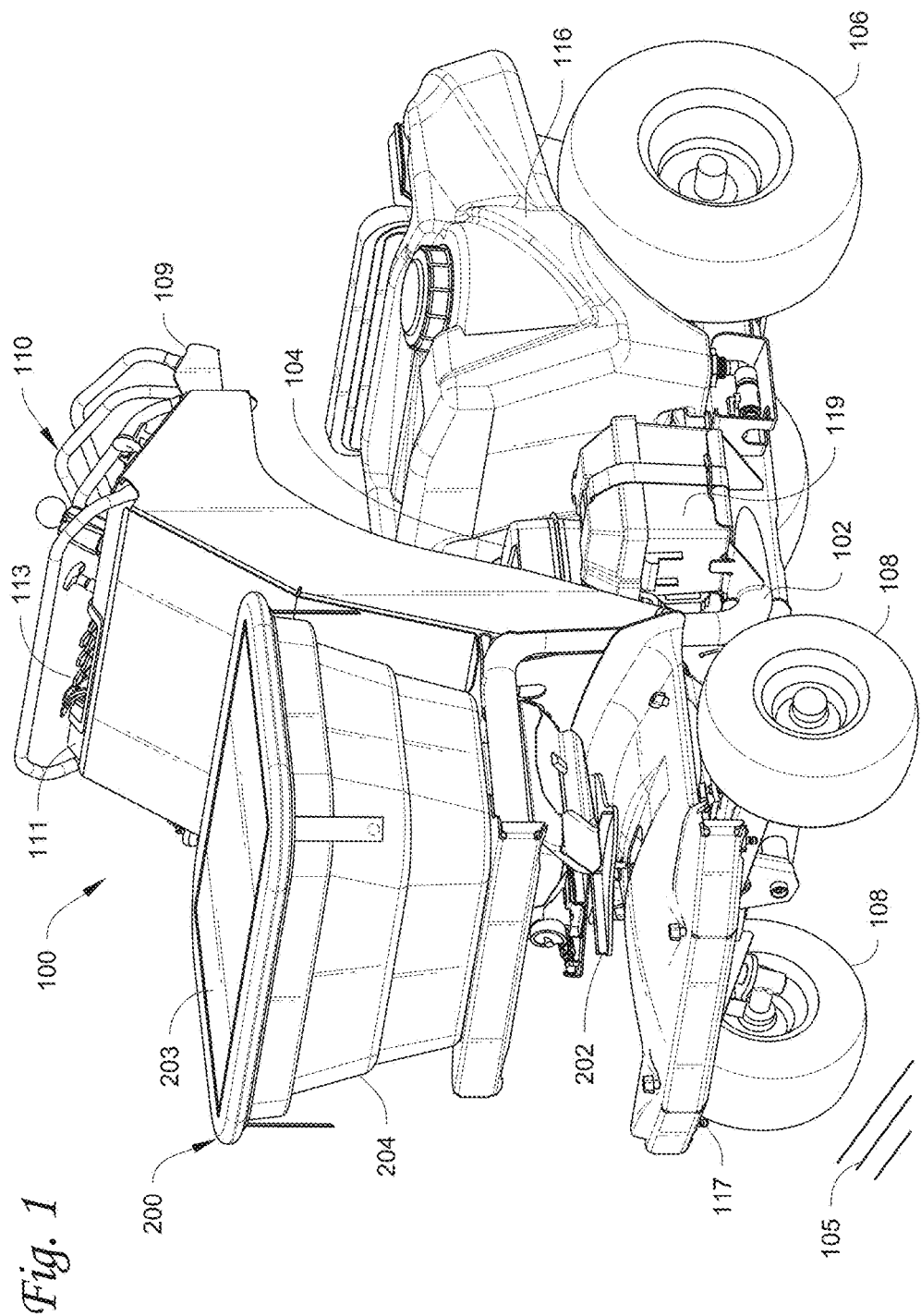
FIG. 1 is a perspective view of a motorized material broadcast spreader in accordance with one embodiment of the disclosure, the spreader shown attached to a dedicated-use vehicle.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Embodiments of the present disclosure may include a powered (e.g., motorized) broadcast material spreader apparatus (also referred to herein merely as a "spreader") including a granular material hopper having an optional floor and one or more upwardly extending walls that together partially enclose an interior volume of the hopper. A first wall may define an opening passing outwardly from the interior volume through the first wall. A motor is provided and surrounded by the one or more walls. The motor includes a motor housing and an output shaft extending downwardly from the motor housing through an aperture formed in the hopper. The motor may be used to rotate a spinning broadcast spinner attached to an end of the output shaft. In some embodiments, the output shaft may further include an agitator to mix the granular material contained within the hopper. A motor cover may also be provided and includes a contact surface congruent with a mating inner surface of the first wall. The motor cover is positioned within the interior volume of the hopper such that the contact surface adjoins the mating inner surface of the first wall, thereby effectively sealing the opening. The motor cover is further configured to form at least part of a motor compartment that effectively isolates the motor from the interior volume of the hopper. The motor compartment is accessible from outside the hopper via the opening in the first wall.

FIG. 1 illustrates a dedicated material spreader/sprayer vehicle 100 incorporating a material application apparatus in accordance with one embodiment of the present disclosure. The material application apparatus may include a granular material (e.g., turf fertilizer, pesticide (including, but not limited to, fungicide, herbicide, and insecticide), seed, ice control materials, etc.) broadcast spreader 200 and, optionally, a liquid (e.g., fertilizer, pesticide, ice control materials, etc.) sprayer.

As used herein, the term "granular material" may include particles of most any size or shape suitable for ground surface applications. For example, granular materials may range from powders up to larger particle sizes (e.g., rock salt).

While the spreader 200 is shown as forming part of a dedicated-use vehicle 100, such a configuration is not limiting. Rather, the spreader 200 could be of most any construction including, for example, a stand-alone apparatus that removably attaches to a general purpose utility vehicle, or a dedicated walk-behind or towable apparatus.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100/spreader 200 while the vehicle/spreader is in an operating configuration, e.g., while the vehicle 100 is positioned such that wheels 106 and 108 rest upon a generally horizontal ground surface 105 as shown in FIG. 1. These terms are used only to simplify the description, however, and not to limit the interpretation of any embodiment described.

While the construction of the vehicle 100 is not necessarily central to an understanding of exemplary embodiments (e.g., other vehicle configurations are certainly contemplated), general construction of the vehicle is briefly described below with initial reference to FIG. 1. More detailed information regarding the exemplary vehicle 100 may be found in co-pending U.S. application Ser. No. 14/697,909.

With reference to the figures of the drawing, wherein like reference numerals designate like parts and assemblies throughout the several views, FIG. 1 illustrates the vehicle 100 having a frame or chassis 102. The exemplary chassis 102 supports a prime mover (e.g., internal combustion engine 104), which may, in one embodiment, be located at or near a central portion of the chassis 102. One or more, e.g., left and right ground-engaging drive members (e.g., rear drive wheels 106 (only left wheel visible)) may be coupled for rotation, relative to left and right sides, respectively, of the chassis 102. One or both drive wheels 106 may be powered (e.g., by the engine 104) to rotate relative to the chassis 102 about a fixed axis such that the drive wheel(s) may propel the vehicle 100 over the ground surface 105. In one embodiment, the vehicle 100 may be configured with a hydrostatic transmission having an open differential operable to effectively drive either or both of the drive wheels 106 in a manner similar to a conventional rear-wheel drive automobile. Of course, other types of transmissions (e.g., limited slip differential, independently-driven wheels, etc.) are possible without departing from the scope of the disclosure.

While described herein as an internal combustion engine 104, other embodiments could utilize other prime movers (e.g., an electrical power source) to power the drive wheels 106. Still further, while illustrated as wheels 106, other embodiments may utilize other drive members (e.g., tracks or the like).

The vehicle 100 may additionally include one or more, e.g., two, steerable front support members (e.g., wheels 108). Thus, the rear drive wheels 106 may support a rear portion of the vehicle 100 in rolling engagement with the ground surface 105, while the front wheel(s) 108 may likewise support a front portion of the vehicle. Once again, while described herein as utilizing two rear drive wheels and two front wheels, such a configuration is merely exemplary. For example, other embodiments may use more or less wheels (e.g., a tri-wheel configuration), while still other embodiments may provide different drive wheel configurations (e.g., front-wheel drive or all-wheel drive).

The vehicle 100 may also include a control station 110 containing one or more vehicle controls. In some embodiments, the control station 110 may include both a movable (e.g., lateral or side-to-side swinging) operator control handle 109, as well as a fixed or stationary control area 111. The control station 110 may be conveniently accessible by an operator either located upon an operator station (e.g., standing upon a platform (not shown) near a rear end of the vehicle), or walking behind the vehicle.

The control station 110 may include controls (e.g., the control handle 109) that governs vehicle speed and direction, as well as controls 113 that govern various subsystems/mechanisms of the vehicle including, for example engine throttle setting, and control inputs for the material application apparatus (described below).

The material application apparatus may include at least the granular material broadcast spreader system 200. In one embodiment, the system 200 includes at least a hopper 204 and a powered, rotating spinner 202 onto which granular material from the hopper 204 is fed. The spinner 202/hopper 204 may be located at or near the front end of the chassis 102 as shown in FIG. 1. The system 200 may be used to distribute a wide variety of products as stated above to the ground surface 105. In some embodiments, the material application apparatus may also include a liquid sprayer system. The sprayer system may include a reservoir 116 and one or more spray nozzles 117 that hold and distribute, respectively, liquid material to the ground surface. However, as the sprayer system is not central to an understanding of embodiments of the present disclosure, further description is not provided herein.

Figure 2:
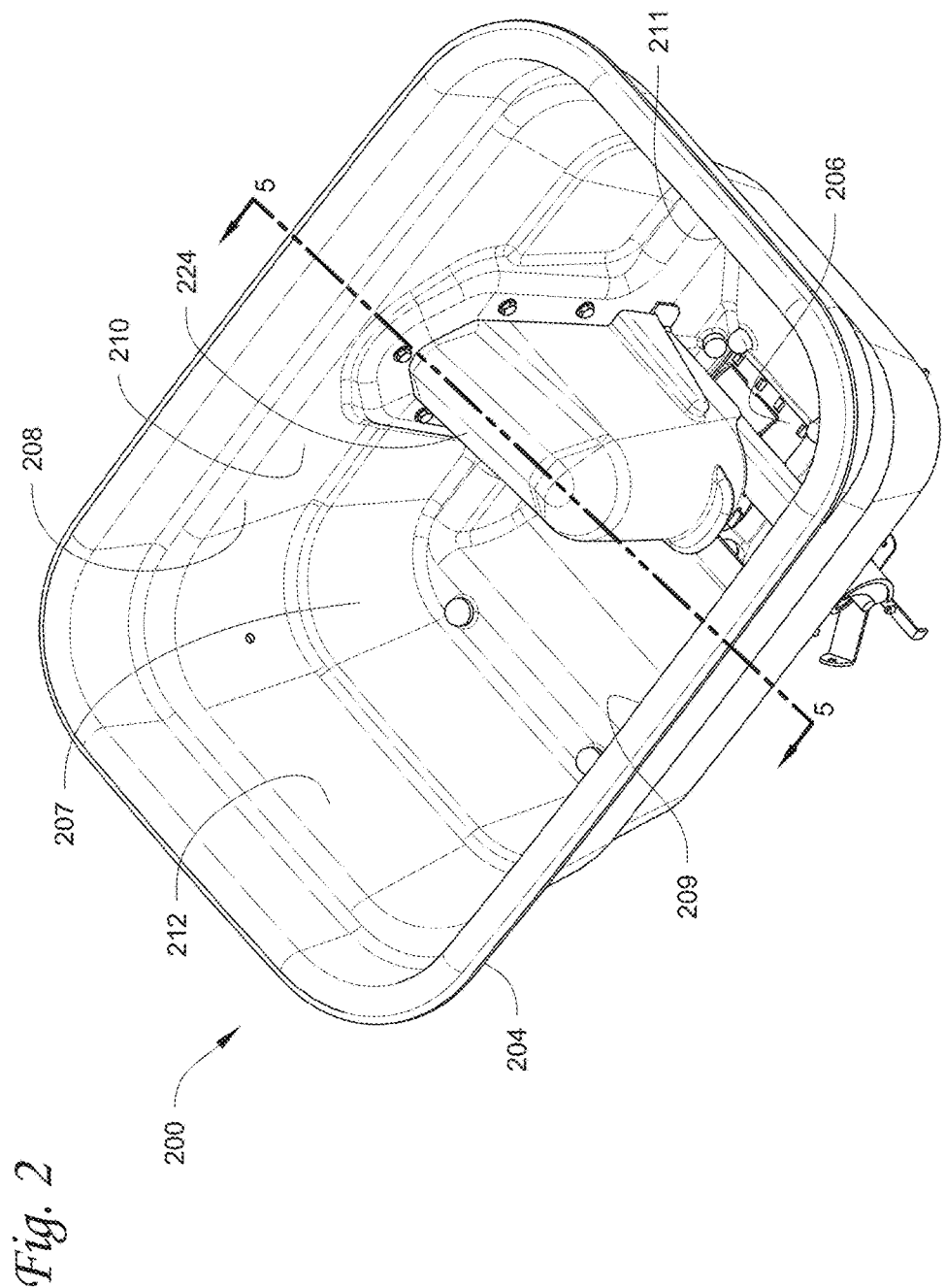
FIG. 2 is an upper perspective view of the broadcast spreader of FIG. 1 removed from the vehicle.
Figure 3:
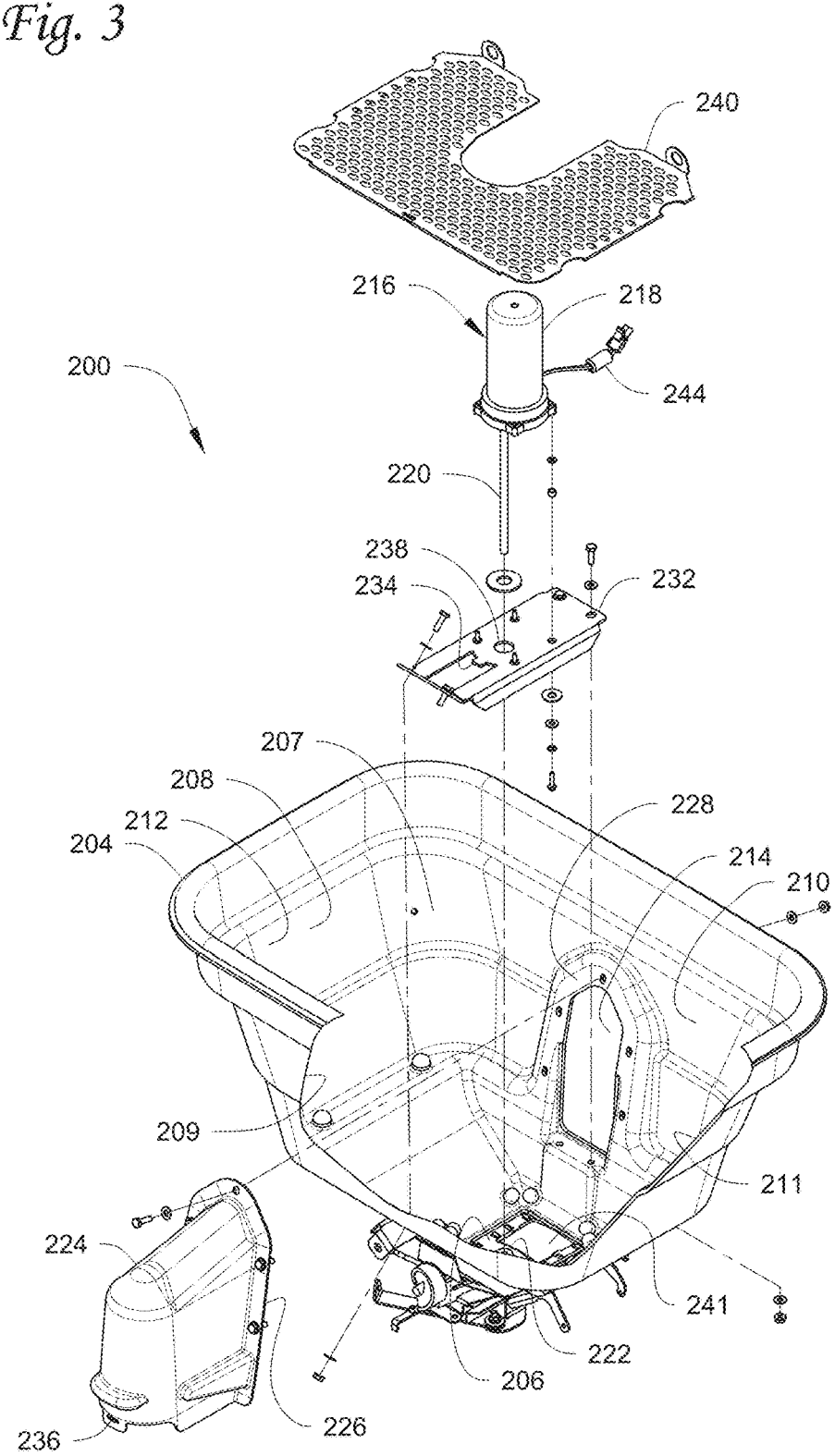
FIG. 3 is an partial cut-away and exploded view of the broadcast spreader of FIG. 2.

With this introduction, a broadcast spreader system in accordance with various embodiments of the present disclosure will now be described, initially with reference to FIGS. 2 and 3. FIG. 2 illustrates a top perspective view of the system 200 (hopper 204) with a hopper cover 203 (see FIG. 1) removed, while FIG. 3 illustrates a cut-away, exploded view of the same.

As shown in these views, the granular material hopper 204 may include one or more upwardly extending walls 208 and, optionally, a floor 206 that together form an open-top container defining and partially enclosing an interior volume 207. In one embodiment, the hopper 204 is defined by front and rear walls (209 and 210, respectively) and left and right walls (211 and 212, respectively). While shown as having two pairs of opposing walls, other multi-walled or single-walled (e.g., inverted cone-shaped) hoppers are also contemplated.

In order to rotate the spinner 202 (see FIG. 1), the spreader system 200 may also include a motor 216 (see FIG. 3) that may be actuated, e.g., via manipulation of the controls 113, to rotate the spinner at variable speeds. Accordingly, when granular material from the hopper is delivered to the spinner 202, the material may be broadcast to the ground surface in a pattern influenced by the rotational speed of the spinner. In addition to controlling spinner speed, the controls 113 may also operate other aspects of the hopper (e.g., a hopper gate that may effectively vary the size of a discharge port 241 of the hopper, thereby controlling the volumetric flow of granular material from the hopper onto the spinner). Accordingly, rate, distribution path width and offset, distribution shape, etc. of the granular material may be controlled by the operator during operation.

A first wall (e.g., rear wall 210) of the hopper 204 may define an opening 214 passing outwardly from the interior volume 207 through the first wall. The opening may, in one embodiment, be spaced-apart vertically from the floor 206 of the hopper 204 as shown in FIG. 3. The motor 216 may be positioned between (such that it is effectively surrounded by) the walls 209, 210, 211, and 212. The motor 216 may include a motor housing 218 and an output shaft 220 extending downwardly from the motor housing, the shaft passing through an aperture 222 formed in the floor 206. An end of the output shaft 220 may attach to the spinner 202 (see FIG. 1) such that rotation of the output shaft results in corresponding rotation of the spinner.

Figure 4:
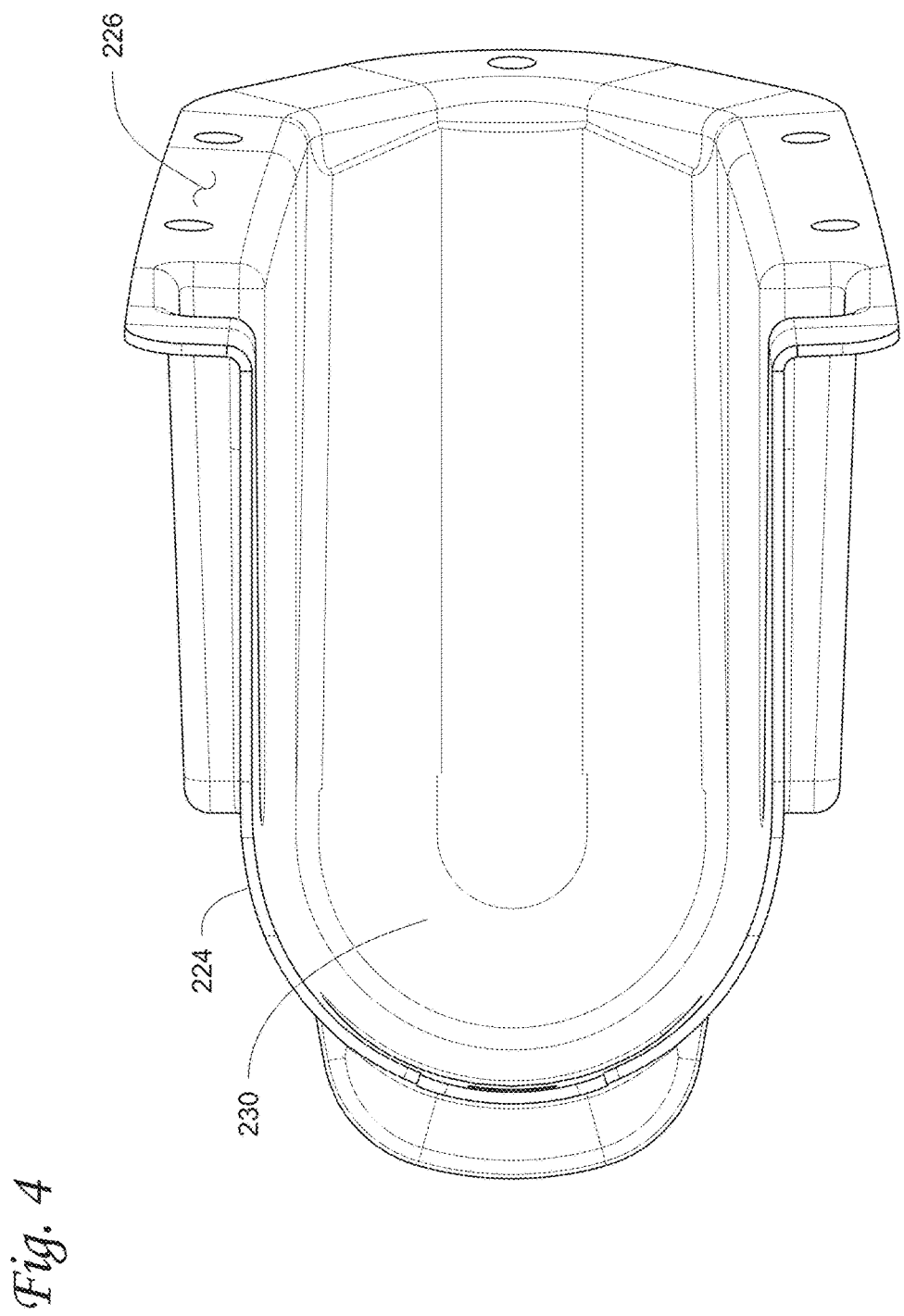
FIG. 4 is a bottom view of a motor cover of the broadcast spreader of FIG. 2.
Figure 5:
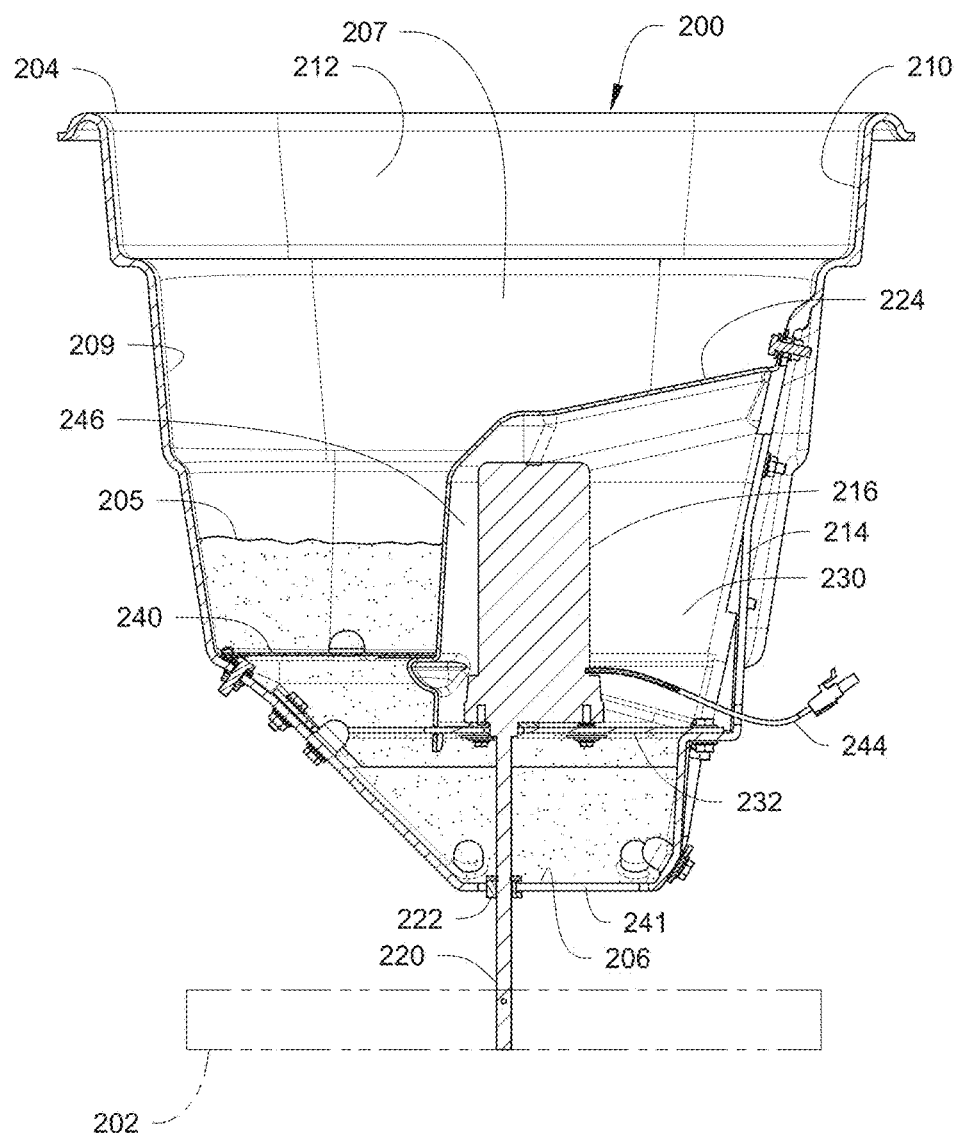
FIG. 5 is a section view of the broadcast spreader taken along line 5-5 of FIG. 2 with some structure removed.
Figure 6:
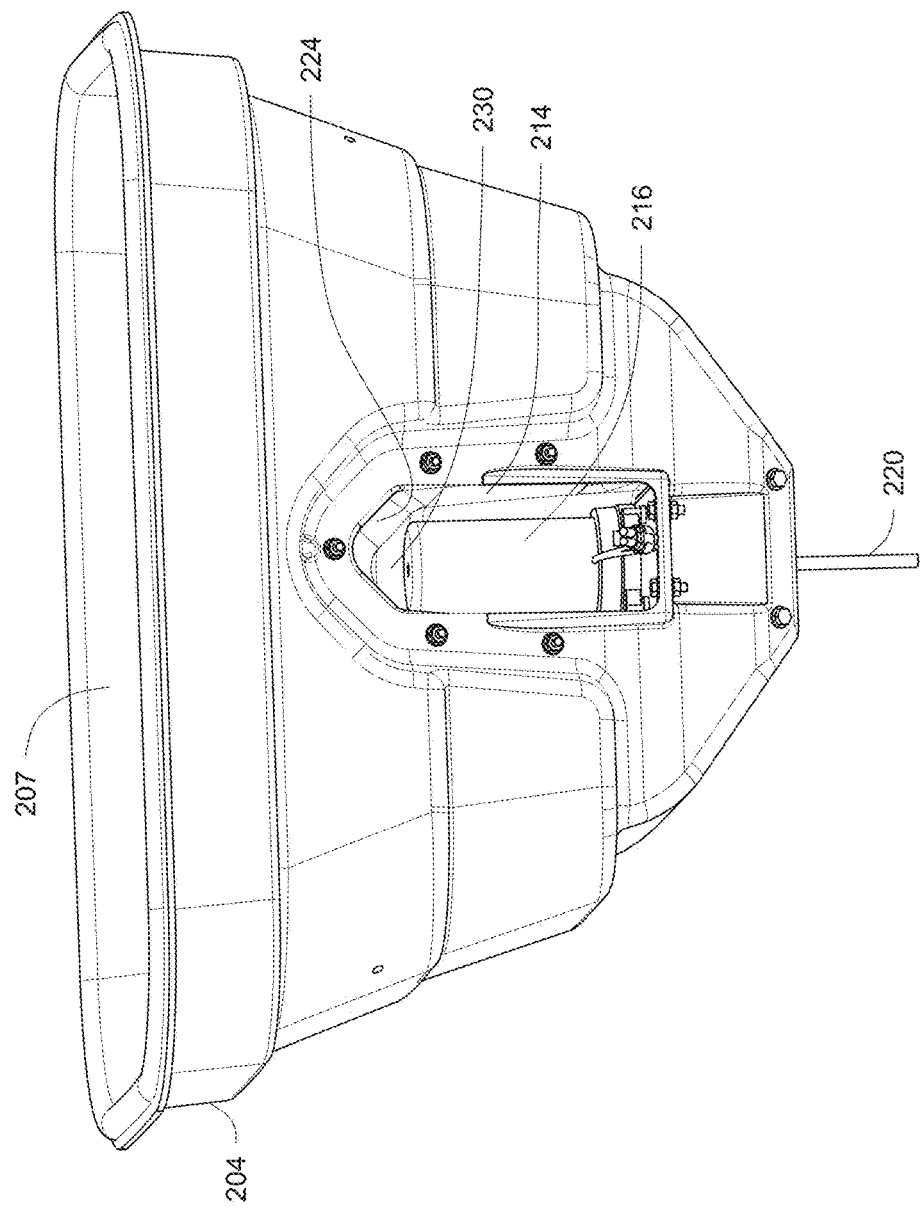
FIG. 6 is an upper rear perspective view of the broadcast spreader of FIG. 2.

FIGS. 2, 3, and 4 further illustrate a motor cover 224. The motor cover 224 may include a contact surface 226 that is congruent or otherwise flush with a mating inner surface 228 of the first (e.g., rear) wall 210. In the illustrated embodiment, the motor cover 224 is positioned within the interior volume 207 of the hopper 204 (e.g., between the front and rear walls and between the left and right walls) such that the contact surface 226 adjoins or abuts the mating inner surface 228 of the rear wall 210, effectively sealing the opening 214. As described below, the exemplary motor cover 224 at least partially surrounds the motor 216 (e.g., surrounds three sides and the top), forming a motor compartment 230 (see, e.g., FIGS. 5 and 6) that effectively isolates the motor from the interior volume 207 (and, therefore, from the granular material contained within the hopper). The motor compartment may however, as shown in FIGS. 5 and 6, remain accessible (from a location outside of the hopper 204) via the opening 214.

While the hopper 204 is shown as having a single opening 214 formed in one wall (e.g., rear wall 210) of the hopper through which the motor compartment 230 is accessible, other embodiments may provide a motor cover/motor compartment that extends entirely across and through (e.g., through opposing sides of) the hopper such that the motor compartment is thereby accessible via two or more openings. For example, the hopper could be constructed with an opening (similar to the opening 214) on each of the left and right walls 211, 212 (or on each of the front and rear walls 209, 210). The motor cover 224 could then be configured to seal around each of these openings in a manner already described above with reference to the opening 214. As a result, the motor compartment 230 could form a channel or passageway that extends completely through the hopper 204. Such a configuration may be beneficial to, for example, provide increased accessibility to the motor, and/or greater convective cooling capacity.

Moreover, while the hopper 204 and the motor cover 224 are described herein as separate components that are assembled during manufacture, those of skill in the art will realize that the hopper and motor cover could be made as an integral (e.g., single piece molded) component.

The system 200 may also include a motor platform 232 (see, e.g., FIG. 3) attached to the one or more walls (e.g., to the front and rear walls 209, 210) and, in one embodiment, spaced-apart from (e.g., above) the floor 206. The motor platform 232 is adapted to secure one or both of the motor 216 and the motor cover 224 in place. For example, the motor platform 232 may form a horizontal mounting surface configured to receive a lower surface of the motor housing 218, after which the motor may be secured to the motor platform (see, e.g., FIG. 2) such that the motor is suspended within the interior volume (e.g., above the floor 206). The motor platform 232 may also secure the motor cover 224 in place via, for example, a tab 234 configured to engage a slot 236 formed in the cover. The platform 232 may include an aperture 238 to accommodate passage of the output shaft 220. As one can appreciate, the platform 232 may, along with the motor cover 224 serve to separate and isolate the motor 216 from the interior volume 207 (e.g., from the material contained within the hopper 204).

While the illustrated embodiment shows the motor supported by the motor platform 232, other embodiments may instead attach the motor to one or both of the motor cover 224 and the walls of the hopper 204. In fact, such an embodiment may entirely eliminate the need for the motor platform 232.

In one embodiment, the system 200 may include a screen 240 suspended within the interior volume 207 at an elevation at or above the motor platform 232. The screen 240 may assist in reducing large masses or clumps of granular material 205 (see FIG. 5) from moving toward the discharge port 241 formed in the floor 206 of the hopper 204 (the discharge port may be located above the spinner 202 and may, via a movable gate, serve to meter or otherwise discharge granular material 205 from the hopper 204). To further reduce clumps of the granular material 205 that pass through the screen 240, some embodiments may include an agitator (radially protruding pin or the like (not shown)) attached to the output shaft 220 of the motor 216, e.g., at an elevation slightly above the discharge port 241/floor 206. Such an agitator, as it rotates with the output shaft 220, may break up such clumps of granular material 205, permitting more consistent flow through the discharge port 241.

As shown in FIG. 2 (note that the screen 240 is removed in this view), the motor cover 224 may be defined by a plurality of curved or angled surfaces adapted to promote flow of the granular material 205 toward the bottom (floor 206) of the hopper 204. That is to say, the motor cover 224 may be designed not only to isolate the motor from the granular material 205 contained within the hopper 204, but also to minimize interference with the downward flow of the granular material. While not illustrated, the motor cover 204 could also be formed with an open or perforated top surface. Such a configuration may increase air flow around the motor during operation. To minimize entry of hopper material into the motor compartment through such an open top, the motor cover forming the open top could extend to or above an elevation of the open top of the hopper 204.

FIG. 5 is a section view taken along line 5-5 of FIG. 2. As shown in this view, the motor cover 224 (along with the motor platform 232) may form the motor compartment 230 in which the motor 216 may reside. Moreover, as shown in this view, the motor cover 224 may provide an air gap 246 between the motor cover 224 and the motor housing 218. As the motor compartment 230 is in communication with ambient air outside the hopper 204 (via the opening 214), the air gap 246 may help to maintain the motor at an acceptable operating temperature. As further shown in FIG. 5, an upper surface of the motor cover 224 may slope upwardly and rearwardly (e.g., toward the opening 214) to assist (e.g., via natural convection) with exhausting warm air from the motor compartment. In some embodiments, a fan or other form of forced air cooling may be provided to circulate air within the motor compartment 230. While the motor cover 224 may take many forms, it may, in one embodiment, have an upper surface that is positioned at an elevation below an elevation of the open top of the hopper 204 as shown in FIG. 5. Such a configuration is not limiting however, as other embodiments may locate the upper surface of the motor cover at an elevation at or above the elevation of the open top.

While other motors (e.g., hydraulic, pneumatic, electro-hydraulic, or electro-pneumatic) are certainly possible, the motor 216 may, in one embodiment, be an electric motor having a power cable 244 that receives electric power from an electrical energy source carried by the vehicle 100. The energy source may be an alternator, generator, or fuel cell, either alone or in combination with an electrical storage device such as a battery (see, e.g., battery 119 of FIG. 1). The energy source may be powered by the prime mover 104 during vehicle operation.

FIG. 6 is a rear perspective view of the hopper 204 illustrating the motor 216 contained within the motor compartment 230. As evident in this view and as stated above, the motor compartment 230 may be in constant fluid communication with ambient air flowing outside the hopper 204.

Embodiments of the present disclosure may thus provide a compact, powered broadcast spreader that locates the motor within the overall envelope of the hopper. Moreover, by incorporating a unique motor cover and platform support, the motor may be effectively isolated from the material contained within the hopper. As a result, motor exposure to materials in the hopper and motor overheating (problems that may otherwise affect a hopper-contained motor) may be minimized.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A powered, material broadcast spreader apparatus comprising:
   a granular material hopper comprising one or more upwardly extending walls that together partially enclose an interior volume of the hopper, wherein a first wall of the one or more walls defines an opening passing through the first wall;
   a motor surrounded by the one or more walls, the motor comprising a motor housing and an output shaft extending downwardly from the motor housing through an aperture formed in the hopper; and
   a motor cover comprising a contact surface congruent with a mating inner surface of the first wall, the motor cover positioned within the interior volume of the hopper such that the contact surface adjoins the mating inner surface of the first wall to seal the opening from the interior volume, the motor cover further configured to form a motor compartment adapted to isolate the motor from the interior volume, wherein the motor compartment is accessible from outside the hopper via the opening in the first wall.

2. The apparatus of claim 1, wherein the hopper forms an open top and an upper surface of the motor cover is positioned at an elevation below an elevation of the open top.

3. The apparatus of claim 1, wherein the motor cover is configured to provide an air gap between the motor cover and the motor housing.

4. The apparatus of claim 1, wherein the hopper further defines a discharge port configured to discharge granular material contained in the hopper.

5. The apparatus of claim 1, wherein the motor cover comprises a plurality of curved surfaces adapted to promote downward flow of granular material.

6. The apparatus of claim 1, wherein the motor compartment defines an upper surface shaped to promote convective air flow out of the motor compartment.

7. The apparatus of claim 1, wherein the one or more walls comprises two pairs of opposing walls.

8. The apparatus of claim 1, wherein the one or more walls further define an open top.

9. The apparatus of claim 1, wherein a lowermost surface of the interior volume of the hopper forms a floor, and wherein the opening is vertically spaced-apart from the floor.

10. The apparatus of claim 1, further comprising a motor platform attached to the one or more walls, the platform adapted to secure one or both of the motor and the motor cover in place.

11. A powered, material broadcast spreader apparatus comprising:
a granular material hopper comprising a floor, upwardly extending front and rear walls, and upwardly extending left and right walls, wherein the floor and the walls together define an interior volume of the hopper, and wherein a first wall of the front and rear and left and right walls defines an opening passing through the first wall;
a motor positioned between: the front and rear walls; and the left and right walls, the motor comprising a motor housing and an output shaft extending downwardly from the motor housing through an aperture formed in the floor; and
a motor cover comprising a contact surface congruent with a mating inner surface of the first wall, the motor cover positioned between the front and rear walls and between the left and right walls such that the motor cover surrounds the motor, wherein the contact surface adjoins the mating inner surface to seal the opening from the interior volume, the motor cover further configured to form a motor compartment adapted to separate the motor from granular material contained within the interior volume, wherein the motor compartment is accessible, via the opening in the first wall, from outside the hopper.

12. The apparatus of claim 11, wherein the motor is suspended within the interior volume above the floor.

13. The apparatus of claim 11, further comprising a motor platform attached to one or more of the front and rear walls and left and right walls, the platform spaced-apart from the floor of the hopper.

14. The apparatus of claim 11, further comprising a screen suspended within the interior volume of the hopper above the floor.

15. The apparatus of claim 11, wherein the hopper forms an open top and an upper surface of the motor cover is positioned at an elevation below an elevation of the open top.

16. The apparatus of claim 11, further comprising a broadcast spinner attached to an end of the output shaft extending outside of the hopper.

17. The apparatus of claim 11, wherein the motor cover is configured to provide the motor compartment with an air gap between the motor cover and the motor housing.

18. A powered vehicle comprising:
a chassis;
ground engaging members adapted to support the chassis relative to a ground surface;
a prime mover attached to the chassis and adapted to provide power to one or more of the ground engaging members; and
a material broadcast spreader apparatus attached to the chassis at or near a front end of the chassis, the apparatus comprising:
a granular material hopper comprising a floor, upwardly extending front and rear walls, and upwardly extending left and right walls, wherein the floor and the walls together define an interior volume of the hopper, and wherein the rear wall defines an opening passing through the rear wall;
a motor positioned between: the front and rear walls; and the left and right walls, the motor comprising a motor housing and an output shaft extending downwardly from the motor housing through an aperture formed in the floor; and
a motor cover comprising a contact surface congruent with a mating inner surface of the rear wall, the motor cover positioned between the front and rear walls and between the left and right walls such that the motor cover at least partially surrounds the motor, wherein the contact surface adjoins the mating inner surface to seal the opening from the interior volume, the motor cover further configured to form a motor compartment adapted to separate the motor from granular material contained within the interior volume, wherein the motor compartment is accessible, via the opening in the rear wall, from outside the hopper.

19. The vehicle of claim 18, wherein the motor cover is configured to provide the motor compartment with an air gap between the motor cover and the motor housing.

20. The vehicle of claim 18, wherein the motor comprises an electric motor that receives electrical power from an electrical energy source located on the chassis.

* * * * *